UNITED STATES PATENT OFFICE.

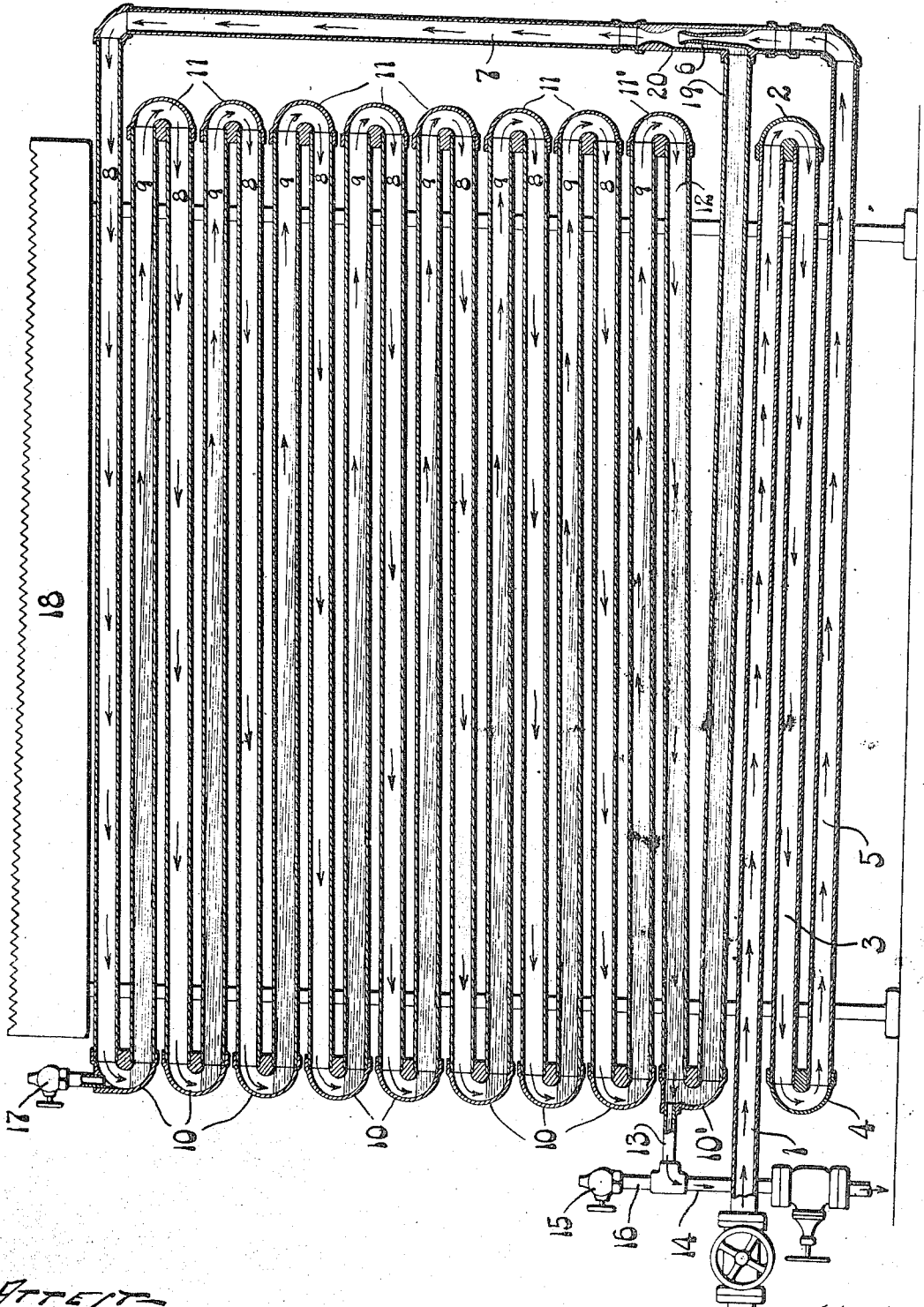

PHILIP DE C. BALL, OF NEAR FERGUSON, MISSOURI.

CONDENSER.

1,177,166.  Specification of Letters Patent.  Patented Mar. 28, 1916.

Application filed March 5, 1915. Serial No. 12,256.

*To all whom it may concern:*

Be it known that I, PHILIP DE C. BALL, a citizen of the United States of America, a resident of the county of St. Louis, near Ferguson, State of Missouri, have invented certain new and useful Improvements in Condensers, of which the following is a full, clear, and exact description, reference being had to the accompanying drawings, forming a part of this specification.

My invention relates to improvements in condensers of the type used in refrigerating systems for the purpose of liquefying ammonia gas.

One of the objects of the invention is to produce a simple and very efficient ammonia condenser in which the liquid ammonia is utilized as a cooling agent for the ammonia gas. This object is preferably attained by a series of fluid conductors adapted to receive the ammonia gas, and which are so arranged that the liquid ammonia will accumulate and form liquid seals at different points in the conductors. The ammonia gas, forced into these conductors, passes through the liquid seals and the heat of the gas is readily absorbed by the liquid in the conductors, as well as by another cooling agent (preferably water) applied at the exterior of the conductors.

The invention also includes certain details of construction which will be hereinafter described and set forth in the claims.

The drawing is a vertical section of a condenser embodying the features of my invention.

The ammonia gas, passing from the gas-compressor, flows through pipe 1, return bend 2, pipe 3, return head 4, pipe 5, and then upwardly through ejector nozzle 6 into a vertical pipe 7. The vertical pipe 7 leads to a condenser coil consisting of pipe sections 8 and 9 and return bends 10 and 11 connecting said pipe sections.

12 designates a delivery pipe at the bottom of the condenser coil, this pipe being a member of the condenser coil, and leading from a return bend 11' to a return bend 10', the latter being provided with an outlet for the discharge of liquid ammonia from the condenser.

13 designates a discharge pipe leading from the return bend 10' and communicating with a pipe 14 leading to the ammonia receiver (not shown).

A purge valve 15 is preferably secured to a pipe section 16 which communicates with the return bend 10' near the lower end of the condenser coil.

17 designates a purge valve for controlling the discharge of gas from the upper end of the condenser coil.

When the condenser is in service, the condenser coil is preferably cooled through the medium of water flowing from a distributing trough 18. The ammonia gas liquefies in passing through the different pipe sections 8 and 9 and liquid ammonia is discharged through the discharge pipe 13 and pipe 14.

A portion of the liquid ammonia passes from the return bend 10', through a pipe 19, to a nozzle housing 20 which surrounds the ejector nozzle 6. The nozzle and its housing are preferably so arranged that the surface of the ammonia in the nozzle housing will be below the upper end of nozzle, as shown in the drawing. The ammonia gas passes through the nozzle 6 under a high degree of pressure, and liquid ammonia drawn from pipe 19 is forced upwardly from the nozzle housing to become trapped in the condenser coil and serve as a cooling medium for the gas. The discharge opening of the nozzle 6 is preferably flared outwardly toward the end of the nozzle to permit the stream of gas to spread and strike the curved wall of the nozzle housing.

The condenser coil is constructed to produce a series of traps for the liquid ammonia, and these traps are so arranged that the ammonia gas, in passing through the pipes 9, must flow through the liquid ammonia in the traps. This is a decided advantage, for as is well known, the heat of the ammonia gas will be very readily absorbed by a liquid, and each trap constitutes a liquid seal through which the gas must flow in passing through the condenser. Moreover, it is an advantage to form these traps in the condenser coil where they will be subjected to the action of the water or other cooling agent on the surface of the coil.

The traps I have shown are formed by the inclined pipes 9 connected by the return bends 10, said pipes being so arranged that their receiving ends are lower than their discharge ends. Owing to the inclination of the pipes 9, liquid ammonia will accumulate therein and form liquid seals at the inlet ends of the pipes. By arranging the pipes 9 in this manner, they constitute traps for the liquid ammonia, and the surface of the liquid contained in each pipe 9 is above the plane of the inlet and immediately below the plane of the outlet opening of the pipe. As the ammonia gas condenses, it overflows at the discharge ends of the pipes 9, always leaving sufficient liquid in the condenser to form a liquid seal at one end of each pipe 9. The pipes 8, arranged alternately between the pipes 9, are preferably parallel with said pipes 9.

Air and non-condensable gas which passes through the different liquid seals to the lower portion of the condenser, may be removed by opening the purge valve 15.

I claim:—

1. An ammonia condenser comprising a condenser coil including a series of fluid conductors communicating with each other and arranged to form a series of traps, said traps being adapted to receive the liquid ammonia, and each of said conductors being so arranged that the surface of the liquid ammonia contained therein will be above the plane of the opening at the lower end of the fluid conductor and immediately below the plane of the opening at the upper end of said conductor.

2. An ammonia condenser comprising a condenser coil including a series of fluid conductors communicating with each other and arranged to form a series of traps, said traps being adapted to receive the liquid ammonia, each of said conductors having an inlet opening at its lower end and an overflow opening at its upper end, and each of said conductors being inclined so that the surface of the liquid ammonia contained therein will be above the plane of its inlet opening and immediately below the plane of its overflow opening.

3. An ammonia condenser comprising a condenser coil including a series of inclined pipes arranged to form a series of traps, one end of each of said inclined pipes being lower than the other end thereof so that the liquid ammonia will accumulate and form liquid seals at the lower ends of said inclined pipes.

4. An ammonia condenser comprising a series of pipes provided with return bends at their ends so as to form a condenser coil, one of said pipes being inclined so that the liquid ammonia will accumulate therein, form a liquid seal at one end thereof and overflow at the opposite end.

5. An ammonia condenser having a series of inclined pipes arranged to form a series of traps for the liquid ammonia, each of said inclined pipes having an inlet opening at its lower end and an overflow opening at its upper end, and each of said inclined pipes being so arranged that the surface of the liquid ammonia contained therein will be above the plane of its inlet opening and immediately below the plane of its overflow opening, and pipes arranged alternately between the first mentioned pipes and connected thereto so as to establish communication between the said first mentioned pipes.

P. DE C. BALL.

In the presence of—
  A. J. McCauley,
  E. K. Clark.